(12) United States Patent
Zhao et al.

(10) Patent No.: US 12,712,452 B2
(45) Date of Patent: Aug. 18, 2026

(54) SWITCHING CONVERTER WITH OVERSHOOT SUPPRESSION AND CONTROL METHOD THEREOF

(71) Applicant: Chengdu Monolithic Power Systems Co., Ltd., Chengdu (CN)

(72) Inventors: Keke Zhao, Hangzhou (CN); Wangmiao Hu, Hangzhou (CN); Ting Ma, Hangzhou (CN); Gang Yan, Hangzhou (CN); Lijie Jiang, Hangzhou (CN); Fangyu Zhang, Hangzhou (CN); Huichun Dai, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 375 days.

(21) Appl. No.: 18/321,464

(22) Filed: May 22, 2023

(65) Prior Publication Data

US 2023/0299671 A1 Sep. 21, 2023

(30) Foreign Application Priority Data

May 31, 2022 (CN) ......................... 202210613395.7

(51) Int. Cl.
*H02M 3/156* (2006.01)

(52) U.S. Cl.
CPC ................................ *H02M 3/1566* (2021.05)

(58) Field of Classification Search
CPC ............ H02M 3/02; H02M 3/04; H02M 3/10; H02M 3/135; H02M 3/137; H02M 3/142; H02M 3/155; H02M 3/156; H02M 3/1566; H02M 3/157; H02M 3/158; H02M 3/1582; H02M 3/1588; H02M 1/0003; H02M 1/0016; H02M 1/0019; H02M 1/0025; H02M 1/08; H02M 1/32; Y02B 70/10
USPC ................ 323/222–226, 266, 271–276, 280, 323/282–285, 351; 363/50, 56.12, 123, 363/124; 361/78, 79, 86, 88–92, 111
See application file for complete search history.

(56) References Cited

U.S. PATENT DOCUMENTS 5,670,865 A * 9/1997 Farwell .................. H02M 1/15 323/284
9,071,142 B2 6/2015 Yang et al.
9,306,451 B2 4/2016 Ouyang
9,806,617 B1 * 10/2017 Ozawa ................ H02M 3/1588
10,044,269 B2 * 8/2018 Lin ....................... H02M 3/158
(Continued)

*Primary Examiner* — Thienvu V Tran
*Assistant Examiner* — Carlos O Rivera-Perez
(74) *Attorney, Agent, or Firm* — Ashurst Perkins Coie US LLP

(57) ABSTRACT

A controller used in a switching converter having a switch and converting an input voltage into an output voltage having a transient profile. The controller includes a transient sensing circuit, a mode determining circuit and an on time regulating circuit. The transient sensing circuit generates a transient voltage signal indicative of the transient profile of the output voltage. The mode determining circuit receives the transient voltage signal and a first feedback voltage signal indicative of the output voltage, and generates a mode signal based on a first comparison between the first feedback voltage signal and a first threshold voltage and a second comparison between the transient voltage signal and a second threshold voltage. The on time regulating circuit generates an on time signal to regulate an on time of the switch based on the mode signal.

18 Claims, 7 Drawing Sheets

(56) References Cited

U.S. PATENT DOCUMENTS

| | | | |
|---|---|---|---|
| 10,348,197 | B2 | 7/2019 | Liu et al. |
| 2017/0141680 | A1 | 5/2017 | Ouyang et al. |

* cited by examiner

SWITCHING CONVERTER WITH OVERSHOOT SUPPRESSION AND CONTROL METHOD THEREOF

CROSS-REFERENCE TO RELATED APPLICATIONS

This application claims the benefit of CN application 202210613395.7, filed on May 31, 2022, and incorporated herein by reference.

TECHNICAL FIELD OF THE INVENTION

The present invention generally relates to electronic circuits, and more particularly but not exclusively, to switching converters with overshoot suppression and associated control methods.

BACKGROUND OF THE INVENTION

Many electronic products, such as laptop, desktop, personal digital assistant and so on, require a power supply to provide regulated power, such as a regulated voltage, to functional blocks. With the development of electronic technology, the power supply usually requires faster transient response speed. Switching converters with constant on time (COT) control characterized in fast transient response and simple structure are widely used in above fields. In a switching converter with COT control, in response to a load step-up event occurring, an on time of a switch of the switching converter is usually increased to slow down the sharp drop in an output voltage of the switching converter. The load step-up event is an event when a current drawn by a load rapidly increases. However, some problems, such as large overshoot in the output voltage and even ring back, may be introduced if the switching converter works in the increased on time mode for a long time.

FIG. 1 shows waveforms of an inductor current IL and an output voltage VO of a switching converter with COT control when a load step-up event occurs. As shown in FIG. 1, a load current IO rapidly increases from time TO, resulting in the output voltage VO rapidly decreasing. To slow down the sharp drop in the output voltage VO, an on time of a switch of the switching converter is increased until the output voltage VO increases to a target output voltage DVO at time T1. For simplicity, the inductor current IL shown in FIG. 1 represents an average current flowing through an inductor of the switching converter. Due to an output capacitor, the output voltage VO is not in-phase but has a phase delay to the inductor current IL. When the output voltage VO returns to the target output voltage DVO at time T1, the inductor current IL becomes much higher than the load current IO, and would charge the output voltage VO to a higher value. As a result, overshoot in the output voltage VO occurs.

SUMMARY OF THE INVENTION

An embodiment of the present invention discloses a controller used in a switching converter. The switching converter has a switch and converts an input voltage into an output voltage having a transient profile. The controller includes a transient sensing circuit, a mode determining circuit and an on time regulating circuit. The transient sensing circuit is configured to generate a transient voltage signal indicative of the transient profile of the output voltage. The mode determining circuit is configured to receive the transient voltage signal and a first feedback voltage signal indicative of the output voltage, and to generate a mode signal based on a first comparison between the first feedback voltage signal and a first threshold voltage and a second comparison between the transient voltage signal and a second threshold voltage. The on time regulating circuit is configured to receive the mode signal and to generate an on time signal to regulate an on time of the switch based on the mode signal.

An embodiment of the present invention discloses a switching converter including a switch, a transient sensing circuit, a mode determining circuit, an on time regulating circuit and a switch control circuit. The switching converter converts an input voltage into an output voltage through the on and off switching of the switch, where the output voltage has a transient profile. The transient sensing circuit is configured to generate a transient voltage signal indicative of the transient profile of the output voltage. The mode determining circuit is configured to receive the transient voltage signal and a first feedback voltage signal indicative of the output voltage, and to generate a mode signal based on a first comparison between the first feedback voltage signal and a first threshold voltage and a second comparison between the transient voltage signal and a second threshold voltage. The on time regulating circuit is configured to receive the mode signal and to generate an on time signal to regulate an on time of the switch based on the mode signal. The switch control circuit is configured to receive the on time signal and a second feedback voltage signal indicative of the output voltage, and to generate a switch control signal to control the switch based on the on time signal and the second feedback voltage signal.

An embodiment of the present invention discloses a control method used in a switching converter. The switching converter has a switch and converts an input voltage into an output voltage having a transient profile. The control method includes the following steps. A first comparing signal is generated based on a first comparison between a first feedback voltage signal indicative of the output voltage and a first threshold voltage. A second comparing signal is generated based on a second comparison between a transient voltage signal indicative of the transient profile of the output voltage and a second threshold voltage. An on time signal is generated to regulate an on time of the switch based on the first comparing signal and the second comparing signal. A set signal is generated based on a second feedback voltage signal indicative of the output voltage and a reference voltage. A switch control signal is generated to control the switch based on the set signal and the on time signal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to “one embodiment”, “an embodiment”, “an example” or “examples” means: certain features, structures, or characteristics are contained in at least one embodiment of the present invention. These “one embodiment”, “an embodiment”, “an example” and “examples” are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as “connected” or “coupled” to another element, it can be directly connected or coupled to the other element, or there could exist one or more intermediate elements. In contrast, when an element is referred to as “directly connected” or “directly coupled” to another element, there is no intermediate element.

Figure 1:
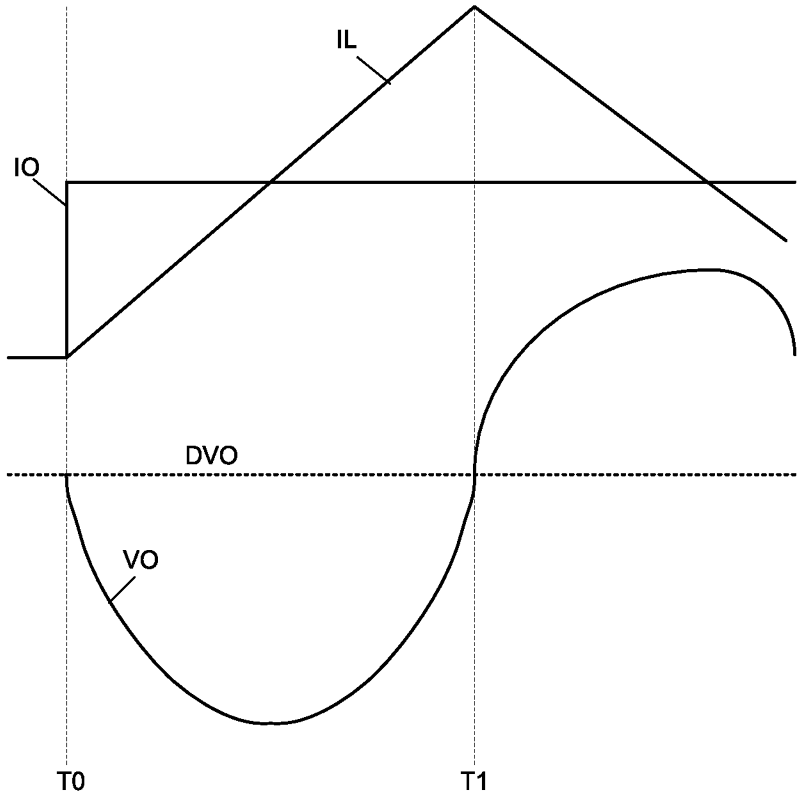
FIG. 1 shows waveforms of an inductor current IL and an output voltage VO of a switching converter with COT control when a load step-up event occurs.
Figure 2:
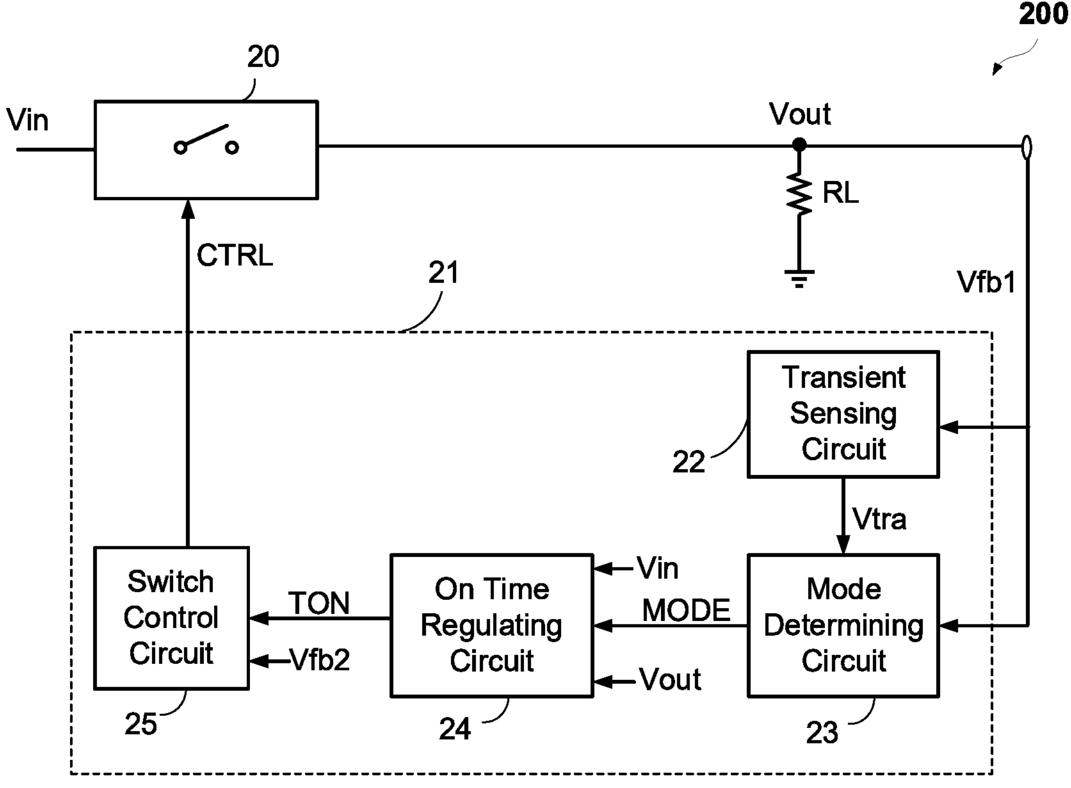
FIG. 2 shows a block diagram of a switching converter 200 in accordance with an embodiment of the present invention.

FIG. 2 shows a block diagram of a switching converter 200 in accordance with an embodiment of the present invention. The switching converter 200 includes a switching circuit 20 and a control circuit 21. The switching circuit 20 includes a switch and is configured to convert an input voltage Vin into an output voltage Vout through the on and off switching of the switch, where the output voltage Vout has a transient profile and is provided to a load RL.

The control circuit 21 includes a transient sensing circuit 22, a mode determining circuit 23, an on time regulating circuit 24 and a switch control circuit 25. The control circuit 21 is configured to generate a switch control signal CTRL to control the switch. In one embodiment, the control circuit 21 is integrated in a single integrated circuit (IC).

The transient sensing circuit 22 receives a first feedback voltage signal Vfb1 indicative of the output voltage Vout, and generates a transient voltage signal Vtra indicative of the transient profile of the output voltage Vout. In one embodiment, the transient sensing circuit 22 is configured to filter out the direct current component of the output voltage Vout, thus the transient voltage signal Vtra can reflect the transient profile of the output voltage Vout better.

The mode determining circuit 23 receives the transient voltage signal Vtra and the first feedback voltage signal Vfb1, and generates a mode signal MODE based on the transient voltage signal Vtra and the first feedback voltage signal Vfb1. In one embodiment, the mode determining circuit 23 is configured to generate the mode signal MODE based on a first comparison between the first feedback voltage signal Vfb1 and a first threshold voltage Vth1 and a second comparison between the transient voltage signal Vtra and a second threshold voltage Vth2. In one embodiment, in response to the first feedback voltage signal Vfb1 decreasing to the first threshold voltage Vth1, the mode signal MODE changes from a first state to a second state. In response to the transient voltage signal Vtra increasing to the second threshold voltage Vth2, the mode signal MODE changes from the second state to the first state.

The on time regulating circuit 24 receives the mode signal MODE, and generates an on time signal TON to regulate an on time of the switch based on the mode signal MODE. In one embodiment, in response to the mode signal MODE changing from the first state to the second state, the on time regulating circuit 24 is configured to increase the on time of the switch. In response to the mode signal MODE changing from the second state to the first state, the on time regulating circuit 24 is configured to decrease the on time of the switch. In one embodiment, the time length during which the on time signal TON stays at a valid state, e.g., logical low, in a switching cycle is equal to the on time of the switch. In one embodiment, the on time regulating circuit 24 further receives the input voltage Vin and the output voltage Vout, and generates the on time signal TON based on the mode signal MODE, the input voltage Vin and the output voltage Vout.

The switch control circuit 25 receives the on time signal TON and generates the switch control signal CTRL to control the switch based on the on time signal TON. In one embodiment, the switch control circuit 25 further receives a second feedback voltage signal Vfb2 indicative of the output voltage Vout, and generates a set signal SET based on a comparison between the second feedback voltage signal Vfb2 and a reference voltage Vref. Then the switch control circuit 25 generates the switch control signal CTRL based on the set signal SET and the on time signal TON.

Figure 3:
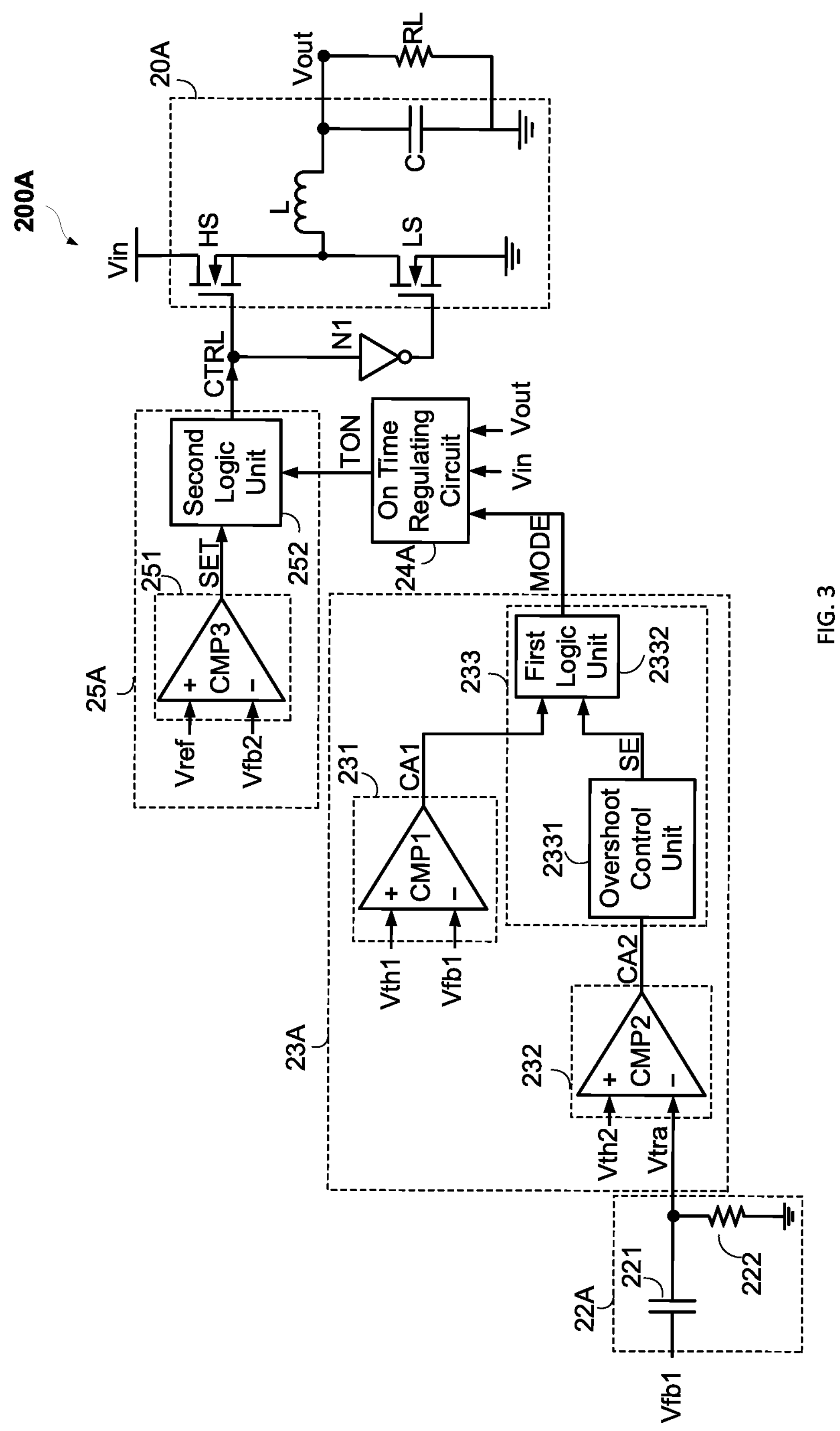
FIG. 3 shows a schematic diagram of a switching converter 200A in accordance with an embodiment of the present invention.

FIG. 3 shows a schematic diagram of a switching converter 200A in accordance with an embodiment of the present invention. As shown in FIG. 3, the switching circuit 20A is configured in a synchronous BUCK converter and includes switches HS, LS, an inductor L and a capacitor C, connected as shown in FIG. 3. In another embodiment, the switch LS may be replaced by a diode. Those skilled in the art can understand that, the switching circuit 20A may be configured in any known DC/DC or AC/DC topology, such as BUCK converter, BOOST converter, Flyback converter and so on. The switches in the switching circuit 20A may be any controllable semiconductor device, such as BJT, JFET, MOSFET, IGBT and so on.

In the example of FIG. 3, the transient sensing circuit 22A includes a first capacitor 221 and a first resistor 222. The first capacitor 221 has a first terminal and a second terminal, where the first terminal is coupled to receive the first feedback voltage signal Vfb1. The first resistor 222 has a first terminal and a second terminal, where the first terminal is coupled to the second terminal of the first capacitor 221, and the second terminal is coupled to a reference ground. The transient sensing circuit 22A generates the transient voltage signal Vtra at the common connection node of the first capacitor 221 and the first resistor 222.

The mode determining circuit 23A includes a first comparing circuit 231, a second comparing circuit 232 and a mode signal generator 233. The first comparing circuit 231 has a first input terminal, a second input terminal and an output terminal, where the first input terminal receives the first threshold voltage Vth1, and the second input terminal receives the first feedback voltage signal Vfb1. The first comparing circuit 231 generates a first comparing signal CA1 at the output terminal based on a comparison between the first feedback voltage signal Vfb1 and the first threshold voltage Vth1. In one embodiment, when the first feedback voltage signal Vfb1 is higher than the first threshold voltage Vth1, the first comparing signal CA1 is at a first state, e.g., logical low. When the first feedback voltage signal Vfb1 is lower than the first threshold voltage Vth1, the first comparing signal CA1 is at a second state, e.g., logical high. In one embodiment, the first comparing circuit 231 includes a first comparator CMP1 having a non-inverting input terminal, an inverting input terminal and an output terminal, where the non-inverting input terminal receives the first threshold voltage Vth1, and the inverting input terminal receives the first feedback voltage signal Vfb1.

The second comparing circuit 232 has a first input terminal, a second input terminal and an output terminal, where the first input terminal receives the second threshold voltage Vth2, and the second input terminal receives the transient voltage signal Vtra. The second comparing circuit 232 generates a second comparing signal CA2 at the output terminal based on a comparison between the transient voltage signal Vtra and the second threshold voltage Vth2. In one embodiment, when the transient voltage signal Vtra is higher than the second threshold voltage Vth2, the second comparing signal CA2 is at a first state. When the transient voltage signal Vtra is lower than the second threshold voltage Vth2, the second comparing signal CA2 is at a second state. In one embodiment, the second comparing circuit 232 includes a second comparator CMP2 having a non-inverting input terminal, an inverting input terminal and an output terminal. In a further embodiment, the non-inverting input terminal receives the second threshold voltage Vth2, and the inverting input terminal receives the transient voltage signal Vtra. The first state of the second comparing signal CA2 is logical low and the second state of the second comparing signal CA2 is logical high. In another further embodiment, the non-inverting input terminal receives the transient voltage signal Vtra, and the inverting input terminal receives the second threshold voltage Vth2. The first state of the second comparing signal CA2 is logical high and the second state of the second comparing signal CA2 is logical low.

The mode signal generator 233 has a first input terminal, a second input terminal and an output terminal. The first input terminal is coupled to the output terminal of the first comparing circuit 231 to receive the first comparing signal CA1, and the second input terminal is coupled to the output terminal of the second comparing circuit 232 to receive the second comparing signal CA2. The mode signal generator 233 generates the mode signal MODE at the output terminal based on the first comparing signal CA1 and the second comparing signal CA2. In one embodiment, in response to the first comparing signal CA1 changing from the first state to the second state, the mode signal MODE changes from the first state (e.g., logical low) to the second state (e.g., logical high). In response to the second comparing signal CA2 changing from the second state to the first state, the mode signal MODE changes from the second state to the first state.

In the example of FIG. 3, the mode signal generator 233 includes an overshoot control unit 2331 and a first logic unit 2332. The overshoot control unit 2331 receives the second comparing signal CA2 and generates an overshoot control signal SE. In response to the second comparing signal CA2 changing from the second state to the first state, the overshoot control signal SE changes from an invalid state (e.g., logical high) to a valid state (e.g., logical low), and stays at the valid state for a hold time $t_{hold}$. That is to say, in response to the second comparing signal CA2 changing from the second state to the first state, the overshoot control signal SE changes from the invalid state to the valid state. After the hold time $t_{hold}$, the overshoot control signal SE changes from the valid state to the invalid state. In one embodiment, the hold time $t_{hold}$ may be stored in a register and may be adjusted via a communication BUS, such as I2C, SMBUS and so on. In one embodiment, the hold time $t_{hold}$ may be adjusted according to specific requirements in practical applications. The first logic unit 2332 receives the first comparing signal CA1 and the overshoot control signal SE, and performs a logic operation to generate the mode signal MODE based on the first comparing signal CA1 and the overshoot control signal SE.

The on time regulating circuit 24A is coupled to the mode determining circuit 23A to receive the mode signal MODE and generates the on time signal TON based on the mode signal MODE. In one embodiment, in response to the mode signal MODE changing from the first state to the second state, the on time regulating circuit 24A is configured to increase the on time of the switch HS. In response to the mode signal MODE changing from the second state to the first state, the on time regulating circuit 24A is configured to decrease the on time of the switch HS. In one embodiment, the on time signal TON is configured to control the switch HS to stay on for a constant time. That is to say, the on time signal TON is configured to control the turning off of the switch HS.

The switch control circuit 25A includes a third comparing circuit 251 and a second logic unit 252. The third comparing circuit 251 has a first input terminal, a second input terminal and an output terminal, where the first input terminal receives the reference voltage Vref, and the second input terminal receives the second feedback voltage signal Vfb2. The third comparing circuit 251 generate the set signal SET at the output terminal based on a comparison between the second feedback voltage signal Vfb2 and the reference voltage Vref. In one embodiment, the third comparing circuit 251 includes a third comparator CMP3 having a non-inverting input terminal, an inverting input terminal and an output terminal, where the non-inverting input terminal receives the reference voltage Vref, and the inverting input terminal receives the second feedback voltage signal Vfb2. In the example of FIG. 3, the first feedback voltage signal Vfb1 and the second feedback voltage signal Vfb2 are shown as different signals. In other embodiments, the first feedback voltage signal Vfb1 is identical to the second feedback voltage signal Vfb2.

The second logic unit 252 receives the set signal SET and the on time signal TON, and generates the switch control signal CTRL to control the switch HS based on the set signal SET and the on time signal TON. In the example of FIG. 3, a NOT gate N1 inverts the switch control signal CTRL to control the switch LS. In one embodiment, in response to the set signal SET at a logical high, the second unit 252 is configured to provide the switch control signal CTRL at a logical high to turn on the switch HS. In response to the on time signal TON changing from a logical low to a logical high, the second unit 252 is configured to provide the switch control signal CTRL at a logical low to turn off the switch HS. In one embodiment, the switch HS stays off for a minimum off time $t_{off}$, then in response to the set signal SET at the logical high, the second unit 252 is configured to provide the switch control signal CTRL at the logical high to turn on the switch HS again.

Figure 4:
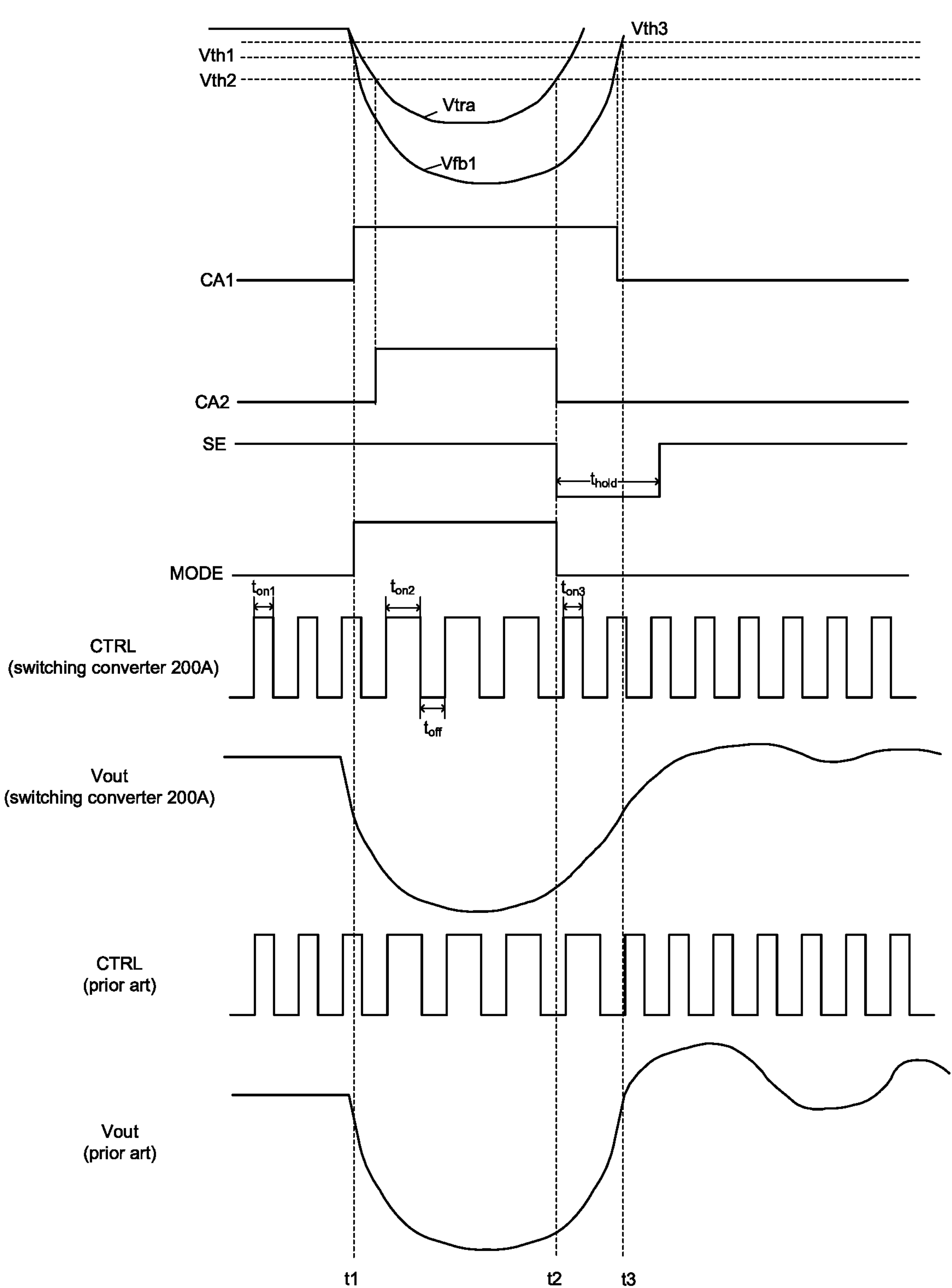
FIG. 4 shows a working waveform comparison between the switching converter 200A and prior art, in accordance with an embodiment of the present invention.

FIG. 4 shows a working waveform comparison between the switching converter 200A and prior art, in accordance with an embodiment of the present invention. Next, the working principle of switching converter 200A shown in FIG. 3 will be illustrated referring to FIG. 4.

Prior to time t1, a load step-up event occurs, resulting in the output voltage Vout decreasing rapidly. The first feedback voltage signal Vfb1 also decreases with the output voltage Vout.

At time t1, in response to the first feedback voltage signal Vfb1 decreasing to the first threshold voltage Vth1, the first comparing signal CA1 changes from the first state to the second state. The transient voltage signal Vtra is higher than the second threshold voltage Vth2 at the time, thus the second comparing signal CA2 is at the first state and the overshoot control signal SE is at the invalid state. The mode signal MODE changes from the first state to the second state based on a logic operation. In response to the mode signal MODE changing from the first state to the second state, the on time regulating circuit 24A is configured to increase the on time of the switch HS to slow down the sharp drop in the output voltage Vout. As shown in FIG. 4, the on time of switch HS is increased from $t_{on1}$ to $t_{on2}$.

At time t2, in response to the transient voltage signal Vtra increasing to the second threshold voltage Vth2, the second comparing signal CA2 changes from the second state to the first state, and the overshoot control signal SE changes from the invalid state to valid state. The first feedback voltage signal Vfb1 is lower than the first threshold voltage Vth1 at the time, thus the first comparing signal CA1 is at the second state. The mode signal MODE changes from the second state to the first state based on a logic operation. In response to the mode signal MODE changing from the second state to the first state, the on time regulating circuit 24A is configured to decrease the on time of the switch HS to suppress overshoot in the output voltage Vout. As shown in FIG. 4, the on time of switch HS is decreased from $t_{on2}$ to $t_{on3}$.

In the prior art, the on time of the switch HS is increased at time t1 and is not decreased until the first feedback voltage signal Vfb1 increases to a third threshold voltage Vth3 at time t3. At time t3, the energy stored in the inductor has been much higher than the energy required by the load.

Compared with the prior art, the transient sensing circuit 22A of the switching converter 200A filters out the direct current component of the first feedback voltage signal Vfb1 and generates the transient voltage signal Vtra which can reflect the transient profile of the output voltage Vout more timely and effectively. The switching converter 200A can decrease the on time of the switch HS in advance to prevent excess energy from being stored in the inductor. For example, the on time of the switch HS is decreased at time t2 in FIG. 4. As a result, the overshoot in the output voltage Vout is suppressed effectively.

Figure 5:
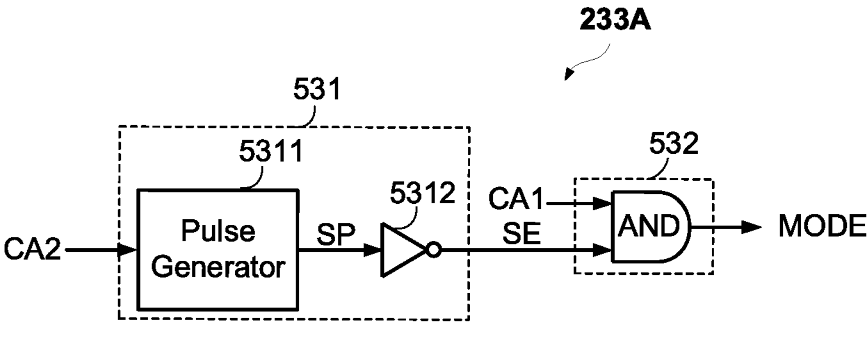
FIG. 5 shows a schematic diagram of a mode signal generator 233A of the switching converter 200A in FIG. 3 in accordance with an embodiment of the present invention.

FIG. 5 shows a schematic diagram of a mode signal generator 233A of the switching converter 200A in FIG. 3 in accordance with an embodiment of the present invention. As shown in FIG. 5, the mode signal generator 233A includes an overshoot control unit 531 and a first logic unit 532. In the example of FIG. 5, the overshoot control unit 531 includes a pulse generator 5311 and a NOT gate 5312. The pulse generator 5311 has an input terminal and an output terminal, where the input terminal receives the second comparing signal CA2. In response to the second comparing signal CA2 changing from the second state to the first state, the pulse generator 5311 generates a pulse signal SP at the output terminal. The width of the pulse signal SP is equal to the hold time $t_{hold}$. The NOT gate 5312 has an input terminal and an output terminal, where the input terminal is coupled to the pulse generator 5311 to receive the pulse signal SP. The NOT gate 5312 inverts the pulse signal SP to generate the overshoot control signal SE at the output terminal. The first logic unit 532 includes an AND gate having a first input terminal, a second input terminal and an output terminal, where the first input terminal receives the first comparing signal CA1, and the second input terminal receives the overshoot control signal SE. The first logic unit 532 performs an AND logic operation on the first comparing signal CA1 and on overshoot control signal SE, and generates the mode signal MODE at the output terminal.

Figure 6:
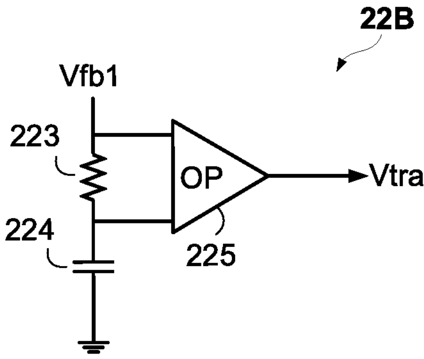
FIG. 6 shows a schematic diagram of a transient sensing circuit 22B of the switching converter 200A in FIG. 3 in accordance with an embodiment of the present invention.

FIG. 6 shows a schematic diagram of a transient sensing circuit 22B of the switching converter 200A in FIG. 3 in accordance with an embodiment of the present invention. In the example of FIG. 6, the transient sensing circuit 22B includes a second resistor 223, a second capacitor 224 and an amplifier 225. The second resistor 223 has a first terminal and a second terminal, where the first terminal receives the first feedback voltage signal Vfb1. The second capacitor 224 is coupled between the second terminal of the second resistor 223 and the reference ground. The amplifier 225 is coupled across the second resistor 223 and generates the transient voltage signal Vtra based on a voltage across the second resistor 223.

Figure 7:
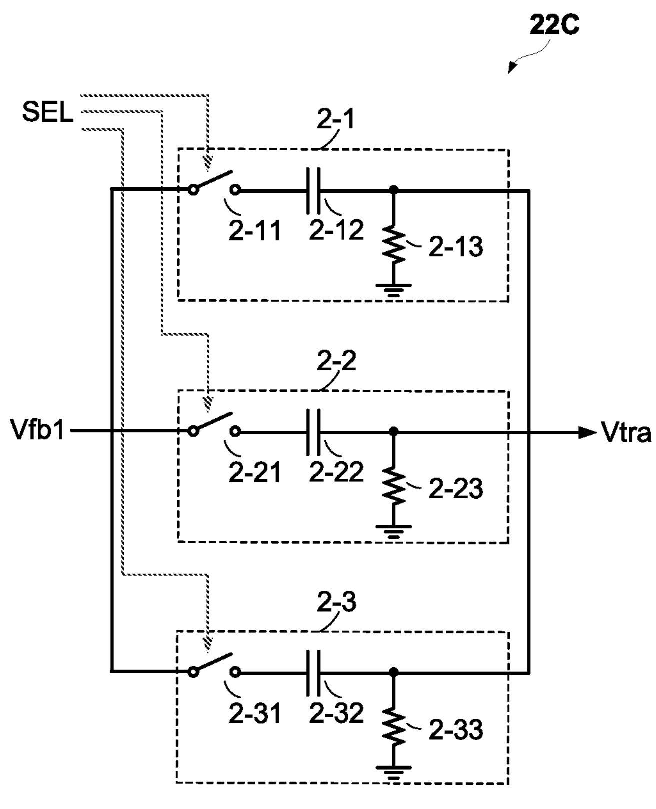
FIG. 7 shows a schematic diagram of a transient sensing circuit 22C of the switching converter 200A in FIG. 3 in accordance with another embodiment of the present invention.

FIG. 7 shows a schematic diagram of a transient sensing circuit 22C of the switching converter 200A in FIG. 3 in accordance with another embodiment of the present invention. In the example of FIG. 7, the transient sensing circuit 22C includes transient sensing units 2-1~2-3, where each of the transient sensing units 2-1~2-3 includes a switch, a capacitor and a resistor. Those skilled in the art can understand that, the transient sensing circuit 22C can include more or fewer transient sensing units. The value of the capacitor and/or the value of the resistor in one transient sensing unit may be different from that in another transient sensing unit to meet specific requirements for different practical applications. A select signal SEL is configured to turn on one of the switches 2-11~2-31, and a corresponding transient sensing unit is configured to receive the first feedback voltage signal Vfb1 and to generate the transient voltage signal Vtra. In one embodiment, the select signal SEL can be set through a Graphical User Interface.

Figure 8:
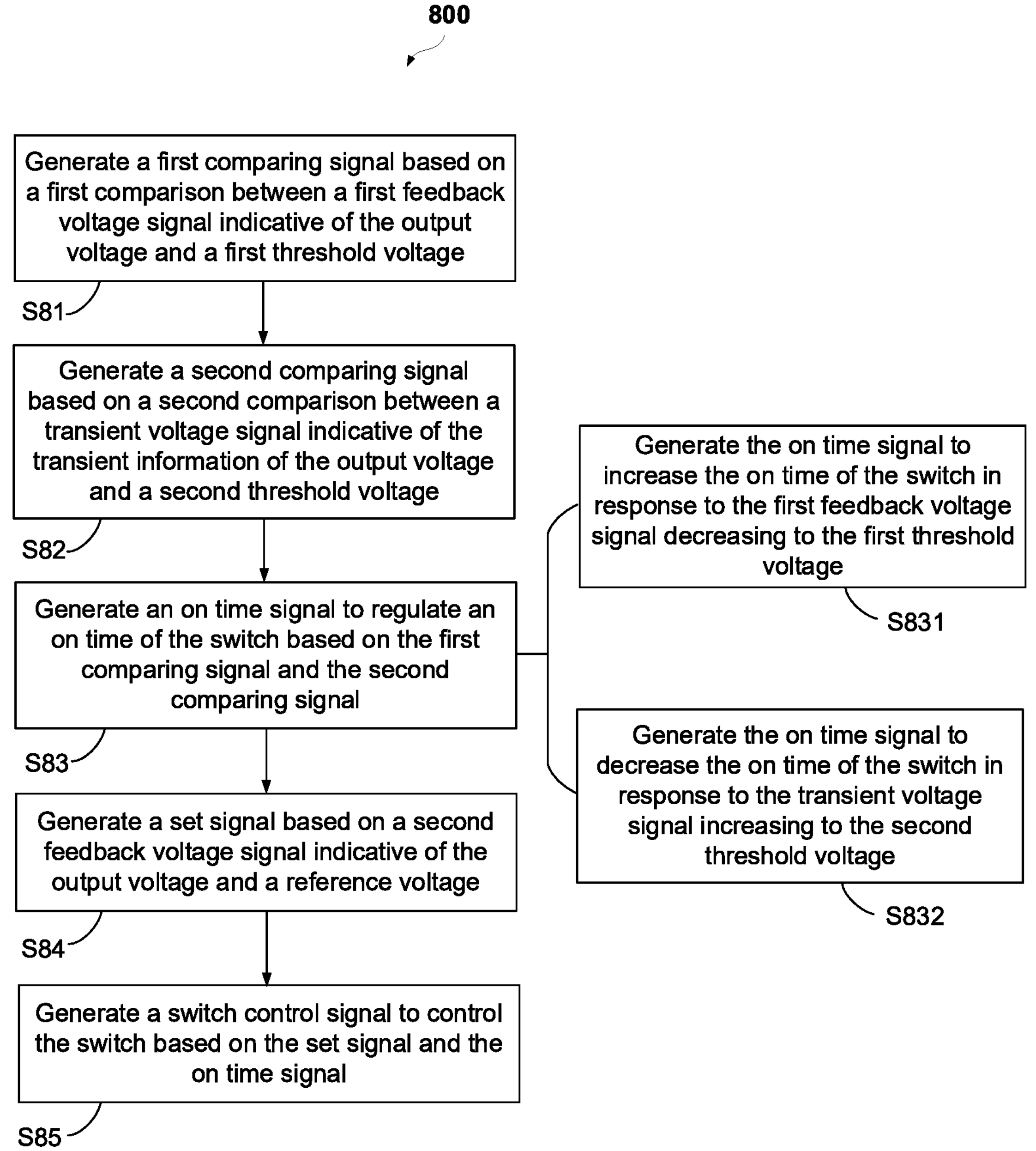
FIG. 8 shows a flowchart of a control method 800 used in a switching converter in accordance with an embodiment of the present invention.

FIG. 8 shows a flowchart of a control method 800 used in a switching converter in accordance with an embodiment of the present invention. The switching converter includes a switch and is configured to convert an input voltage into an output voltage having a transient profile through the on and off switching of the switch. The control method 800 includes steps S81~S85.

At step S81, a first comparing signal is generated based on a first comparison between a first feedback voltage signal indicative of the output voltage and a first threshold voltage.

At step S82, a second comparing signal is generated based on a second comparison between a transient voltage signal indicative of the transient profile of the output voltage and a second threshold voltage.

At step S83, an on time signal is generated to regulate an on time of the switch based on the first comparing signal and the second comparing signal. In one embodiment, the step S83 further includes steps S831 and 3832. At step S831, the on time signal is generated to increase the on time of the switch in response to the first feedback voltage signal decreasing to the first threshold voltage. At step S832, the on time signal is generated to decrease the on time of the switch in response to the transient voltage signal increasing to the second threshold voltage.

At step S84, a set signal is generated based on a second feedback voltage signal indicative of the output voltage and a reference voltage.

At step S85, a switch control signal is generated to control the switch based on the set signal and the on time signal.

In this document, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless specifically defined by the claim language. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted by those skilled in the art without departing from the spirit and the scope of the invention as hereinafter defined by the appended claims as only a preferred embodiment(s) thereof has been disclosed.

What is claimed is:

1. A controller for a switching converter, comprising:

a transient sensing circuit configured to generate a transient voltage signal indicative of a transient profile of an output voltage of the switching converter;

an on time regulating circuit configured to generate an on time signal to regulate an on time of a switch of the switching converter based on a first comparison between a first feedback voltage signal indicative of the output voltage and a first threshold voltage, and a second comparison between the transient voltage signal and a second threshold voltage; and a comparing circuit configured to generate a set signal based on a comparison between a reference voltage and a second feedback voltage signal indicative of the output voltage; and wherein the controller is configured to control the turning on of the switch based on the set signal and configured to control the turning off of the switch based on the on time signal; wherein in response to the first feedback voltage signal decreasing to the first threshold voltage, the controller is configured to enter a mode during which the switch is controlled to be turned on and turned off uninterruptedly based on the set signal and the on time signal, and the on time signal is adjusted; and wherein in response to the transient voltage signal increasing to the second threshold voltage, the controller is configured to exit the mode and the on time signal resumes.

2. The controller of claim 1, wherein the on time regulating circuit is configured to increase the on time of the switch in response to the first feedback voltage signal decreasing to the first threshold voltage; and the on time regulating circuit is configured to decrease the on time of the switch in response to the transient voltage signal increasing to the second threshold voltage.

3. The controller of claim 1, wherein the transient sensing circuit is configured to filter out the direct current component of the output voltage.

4. The controller of claim 1, wherein the transient sensing circuit comprises:

a first capacitor having a first terminal and a second terminal, wherein the first terminal is configured to receive the first feedback voltage signal; and a first resistor having a first terminal and a second terminal, wherein the first terminal is coupled to the second terminal of the first capacitor and is configured to provide the transient voltage signal, and the second terminal is coupled to a reference ground.

5. The controller of claim 1, wherein the transient sensing circuit comprises:

a second resistor having a first terminal and a second terminal, wherein the first terminal is configured to receive the first feedback voltage signal;

a second capacitor having a first terminal and a second terminal, wherein the first terminal is coupled to the second terminal of the second resistor, and the second terminal is coupled to a reference ground; and an amplifier coupled across the second resistor and configured to generate the transient voltage signal based on a voltage across the second resistor.

6. The controller of claim 1, further comprising a mode determining circuit, wherein the mode determining circuit comprises:

a first comparing circuit having a first input terminal, a second input terminal and an output terminal, wherein the first input terminal is configured to receive the first threshold voltage, and the second input terminal is configured to receive the first feedback voltage signal, the first comparing circuit is configured to generate a first comparing signal at the output terminal;

a second comparing circuit having a first input terminal, a second input terminal and an output terminal, wherein the first input terminal is configured to receive the second threshold voltage, and the second input terminal is configured to receive the transient voltage signal, the second comparing circuit is configured to generate a second comparing signal at the output terminal; and a mode signal generator configured to receive the first comparing signal and the second comparing signal, and to generate a mode signal based on the first comparing signal and the second comparing signal.

7. The controller of claim 6, wherein the mode signal generator comprises:

an overshoot control unit having an input terminal and an output terminal, wherein the input terminal is configured to receive the second comparing signal, the overshoot control unit is configured to generate an overshoot control signal at the output terminal based on the second comparing signal; and a first logic unit configured to receive the first comparing signal and the overshoot control signal, and to generate the mode signal based on the first comparing signal and the overshoot control signal.

8. The controller of claim 7, wherein the overshoot control unit comprises:

a pulse generator having an input terminal and an output terminal, wherein the input terminal is configured to receive the second comparing signal, the pulse generator is configured to generate a pulse signal at the output terminal in response to the second comparing signal changing from a second state to a first state; and a NOT gate having an input terminal and an output terminal, wherein the input terminal is configured to receive the pulse signal, the NOT gate is configured to invert the pulse signal to generate the overshoot control signal at the output terminal.

9. The controller of claim 1, wherein the on time regulating circuit is further configured to regulate the on time of the switch based on an input voltage of the switching converter.

10. The controller of claim 1, wherein the switch control circuit comprises:

a second logic unit configured to receive the set signal and the on time signal, and to generate a switch control signal based on the set signal and the on time signal;

wherein in response to the second feedback voltage signal being lower than the reference voltage, the second logic unit is configured to change the switch control signal from a first logic state into a second logic state to turn on the switch.

11. A switching converter comprising: a switch, wherein the switching converter is configured to convert an input voltage into an output voltage through the on and off switching of the switch and wherein the output voltage has a transient profile; a transient sensing circuit configured to generate a transient voltage signal indicative of the transient profile of the output voltage; an on time regulating circuit configured to generate an on time signal to regulate an on time of the switch based on a first comparison between a first feedback voltage signal indicative of the output voltage and a first threshold voltage, and a second comparison between the transient voltage signal and a second threshold voltage; and a comparing circuit configured to generate a set signal based on a comparison between a reference voltage and a second feedback voltage signal indicative of the output voltage; and wherein the turning on of the switch is controlled based on the set signal and the turning off of the switch is controlled based on the on time signal; wherein in response to the first feedback voltage signal decreasing to the first threshold voltage, a controller is configured to enter a mode during which the switch is controlled to be turned on and turned off uninterruptedly based on the set signal and the on time signal, and the on time signal is adjusted; and wherein in response to the transient voltage signal increasing to the second threshold voltage, the controller is configured to exit the mode and the on time signal resumes.

12. The switching converter of claim 11, wherein the on time regulating circuit is configured to increase the on time of the switch in response to the first feedback voltage signal decreasing to the first threshold voltage; and the on time regulating circuit is configured to decrease the on time of the switch in response to the transient voltage signal increasing to the second threshold voltage.

13. The switching converter of claim 11, wherein the transient sensing circuit is configured to filter out the direct current component of the output voltage.

14. The switching converter of claim 11, wherein the transient sensing circuit comprises:

a first capacitor having a first terminal and a second terminal, wherein the first terminal is configured to receive the first feedback voltage signal; and a first resistor having a first terminal and a second terminal, wherein the first terminal is coupled to the second terminal of the first capacitor and is configured to provide the transient voltage signal, and the second terminal is coupled to a reference ground.

15. The switching converter of claim 11, wherein the transient sensing circuit comprises:

a second resistor having a first terminal and a second terminal, wherein the first terminal is configured to receive the first feedback voltage signal;

a second capacitor having a first terminal and a second terminal, wherein the first terminal is coupled to the second terminal of the second resistor, and the second terminal is coupled to a reference ground; and an amplifier coupled across the second resistor and configured to generate the transient voltage signal based on a voltage across the second resistor.

16. A control method for a switching converter, comprising:

generating a first comparing signal based on a first comparison between a first feedback voltage signal indicative of an output voltage of the switching converter and a first threshold voltage;

generating a second comparing signal based on a second comparison between a transient voltage signal indicative of a transient profile of the output voltage and a second threshold voltage;

generating an on time signal to regulate an on time of a switch of the switching converter based on the first comparing signal and the second comparing signal;

generating a set signal based on a comparison between a second feedback voltage signal indicative of the output voltage and a reference voltage;

controlling the turning on of the switch based on the set signal; and controlling the turning off of the switch based on the on time signal; wherein in response to the first feedback voltage signal decreasing to the first threshold voltage, controlling the switching converter to enter a mode during which the switch is controlled to be turned on and turned off uninterruptedly based on the set signal and the on time signal, and the on time signal is adjusted; and wherein in response to the transient voltage signal increasing to the second threshold voltage, controlling the switching converter to exit the mode and the on time signal resumes.

17. The control method of claim 16, wherein the first feedback voltage signal is identical to the second feedback voltage signal.

18. The control method of claim 16, wherein increasing the on time of the switch in response to the first feedback signal decreasing to the first threshold voltage; and decreasing the on time of the switch in response to the transient voltage signal increasing to the second threshold voltage.

* * * * *